(12) United States Patent
Silvester (10) Patent No.: US 7,263,720 B2
(45) Date of Patent: Aug. 28, 2007

(54) METHOD AND MECHANISM FOR VALIDATING LEGITIMATE SOFTWARE CALLS INTO SECURE SOFTWARE

(75) Inventor: Kelan C. Silvester, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 893 days.

(21) Appl. No.: 10/321,742

(22) Filed: Dec. 16, 2002

(65) Prior Publication Data

US 2004/0117616 A1    Jun. 17, 2004

(51) Int. Cl.
*G06F 12/14* (2006.01)
*G08B 23/00* (2006.01)
*H04L 9/00* (2006.01)
*G06F 11/30* (2006.01)

(52) U.S. Cl. .................. 726/22; 713/155; 713/189

(58) Field of Classification Search ............. None
See application file for complete search history.

(56) References Cited

U.S. PATENT DOCUMENTS

| | | | |
|---|---|---|---|
| 5,412,717 A * | 5/1995 | Fischer | 713/156 |
| 5,475,826 A * | 12/1995 | Fischer | 707/1 |
| 6,256,393 B1 * | 7/2001 | Safadi et al. | 380/232 |
| 6,564,325 B1 * | 5/2003 | Travostino et al. | 726/21 |
| 6,595,856 B1 * | 7/2003 | Ginsburg et al. | 463/29 |
| 7,036,020 B2 * | 4/2006 | Thibadeau | 713/193 |
| 2002/0107809 A1 * | 8/2002 | Biddle et al. | 705/59 |
| 2003/0009677 A1 * | 1/2003 | Strongin et al. | 713/189 |
| 2003/0014658 A1 * | 1/2003 | Walker et al. | 713/200 |
| 2003/0131115 A1 * | 7/2003 | Mi et al. | 709/229 |

OTHER PUBLICATIONS

Scott Stabbert. "Authentication and Security for Internet Developers," Oct. 10, 1997, http://msdn.microsoft.com/library/en-us/dnauth/html/dnauth_security.asp, 8 pages.
Trusted Computing Platform Alliance, "TCPA Design Philosophies and Concepts, Version 1.0," Jan. 2001, 33 pages.
Sundeep Bajikar, "Trusted Platform Module Based Security on Notebook PCs—White Paper," Mobile Platforms Group, Intel Corporation, Jun. 20, 2002, 21 pages.

* cited by examiner

*Primary Examiner*—Gilberto Barrón, Jr.
*Assistant Examiner*—Virgil Herring
(74) *Attorney, Agent, or Firm*—Blakely, Sokoloff, Taylor & Zafman LLP (57) ABSTRACT

A method and apparatus for providing an authentication logic to authenticate a registered caller, the authentication logic to use hashes of one or more random locations within the caller's code base to validate that the caller is registered.

31 Claims, 5 Drawing Sheets

METHOD AND MECHANISM FOR VALIDATING LEGITIMATE SOFTWARE CALLS INTO SECURE SOFTWARE

FIELD OF THE INVENTION

The present invention relates to software validation, and more specifically to validation of software calls.

BACKGROUND

Because of the nature of software calls between software modules, it is relatively easy to trap calls to steal input and output information generated by those calls. The "man in the middle" type of security attack is a means for rogue or virus software to masquerade as legitimate software. This type of rogue or virus software can thereby obtain critical data, because the caller assumes the target is valid. In a secure environment, target software needs to ensure that it is receiving calls from a trusted source—e.g. authorization & authentication—and delivering information back to the same trusted source. The calling software may also need to ensure a host is valid.

In the prior art, the security uses a handshake, password, or memory range checks of the callers. However, all of these security precautions are easily circumvented by a caller.

Another prior art method of solving the security problem is computing the hash of the complete target software for each function call or IOCTL, to determine whether it's legitimate caller. However generating such a complete hash is a time consuming activity. Furthermore, once the hash has been validated, virus software can step in to capture function calls.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for validation of software calls. The process uses hashes of one or more random locations within the caller's code base to quickly validate that the caller is the same entity that pre-registered to utilize the software calls. The validation may be done for each call, periodically, at irregular intervals, or only for certain types of calls, such as calls that provides secret data or provides a trusted result such as turning on/off a hardware function.

Figure 1:
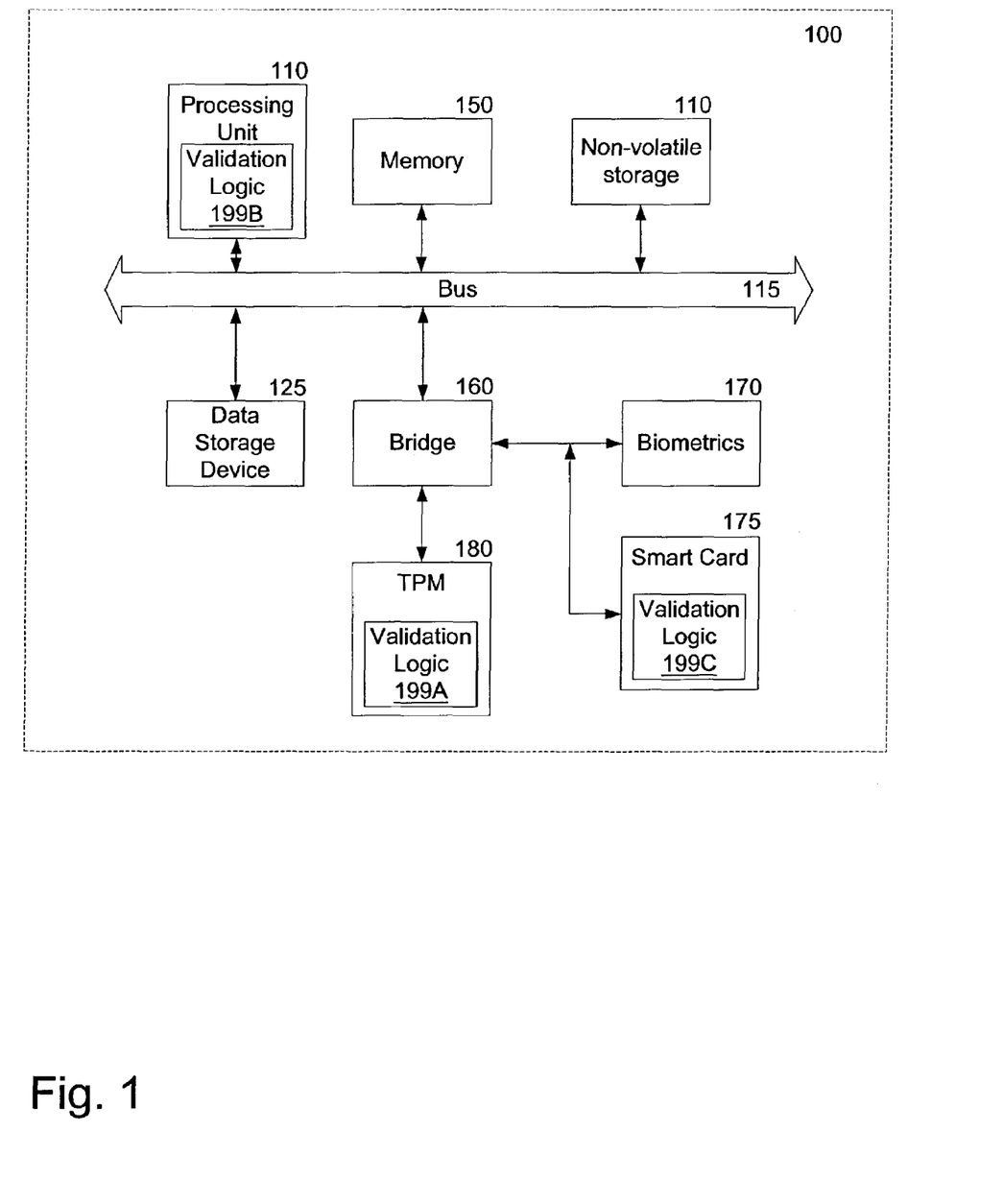
FIG. 1 is a block diagram of a computer system that may be used with the present invention.

FIG. 1 is a block diagram of a computer system that may be used with the present invention. The data processing system illustrated in FIG. 1 includes a bus or other internal communication means 115 for communicating information, and a processor 110 coupled to the bus 115 for processing information. The system further comprises a random access memory (RAM) or other volatile storage device 150 (referred to as memory), coupled to bus 115 for storing information and instructions to be executed by processor 110. Memory 150 also may be used for storing temporary variables or other intermediate information during execution of instructions by processor 110. The system also comprises a read only memory (ROM) and/or static storage device 120 coupled to bus 115 for storing static information and instructions for processor 110, and a data storage device 125 such as a magnetic disk or optical disk and its corresponding disk drive. Data storage device 125 is coupled to bus 115 for storing information and instructions.

The computer system 100 further includes a bridge 160 to couple the bus 115 and processor 110 to other devices. The bridge 160 may be coupled through a PCI, USB, or other bus to biometrics 170 and/or smart card 175. Biometrics 170 provides user authentication. A smart card 175 can provide additional functionality, as well as secure memory.

The bridge 160 may also be coupled to a trusted platform module (TPM) 180. The TPM 180 is designed to provide internal security for the computer system. For one embodiment, the TPM 180 is a secure micro-controller with added cryptographic functionalities to extend a platform of trust. The TPM 180 includes a built-in hash engine to compute hash values of small pieces of data, as well as a random number generator. The TPM also includes some amount of non-volatile memory for storage of secrets that may include previously calculated hash data. A validation logic 199A may use these capabilities as described below.

One or more of the processor 110, TPM 180, and smart card 175 may include validation logic 199B, 199A, and 199C respectively (generically referred to as validation logic 199). Validation logic 199 validates callers that make software calls. As will be described below, validation logic 199 performs a fast validation by checking the hashes or the code base of the caller. However, instead of using the entire caller, which is too time consuming, the validation logic 199 uses only small sections of code, randomly selected. This speeds up validation, and enables synchronous validation without significantly slowing down the response.

Validation logic 199 may be implemented on a separate chip, such as a TPM 180, or similar systems. Alternatively, validation logic 199 may be implemented on a smart card, such as a PCMCIA card. Alternatively, validation logic 199 may be code within the processing unit 110. For another embodiment, the functionality of the validation logic 199 may be distributed among the processor 110, TPM 180 and smart card 175. Thus, for example, the smart card 175 may be used as secure memory, while the TPM 180 is used for hashing, and the processor 110 is used for comparisons. One of skill in the art would understand that alternative locations and functionality distributions may be used.

It will be appreciated by those of ordinary skill in the art that any configuration of the system may be used for various purposes according to the particular implementation. The control logic or software implementing the present invention can be stored in main memory 150, mass storage device 125, or other storage medium locally or remotely accessible to processor 110.

This control logic or software may also be resident on an article of manufacture comprising a computer readable medium having computer readable program code embodied therein and being readable by the mass storage device 125 and for causing the processor 110 to operate in accordance with the methods and teachings herein.

The present invention may also be embodied in a handheld or portable device containing a subset of the computer hardware components described above. For example, the handheld device may be configured to contain only the bus 115, the processor 110, and memory 150 and/or 125. The present invention may also be embodied in a special purpose appliance including a subset of the computer hardware components described above. For example, the appliance may include a processor 110, a data storage device 125, a bus 115, and memory 150. In general, the more special-purpose the device is, the fewer of the elements need be present for the device to function. In some devices, there may be no communications with a user, or communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 110. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

Figure 2:
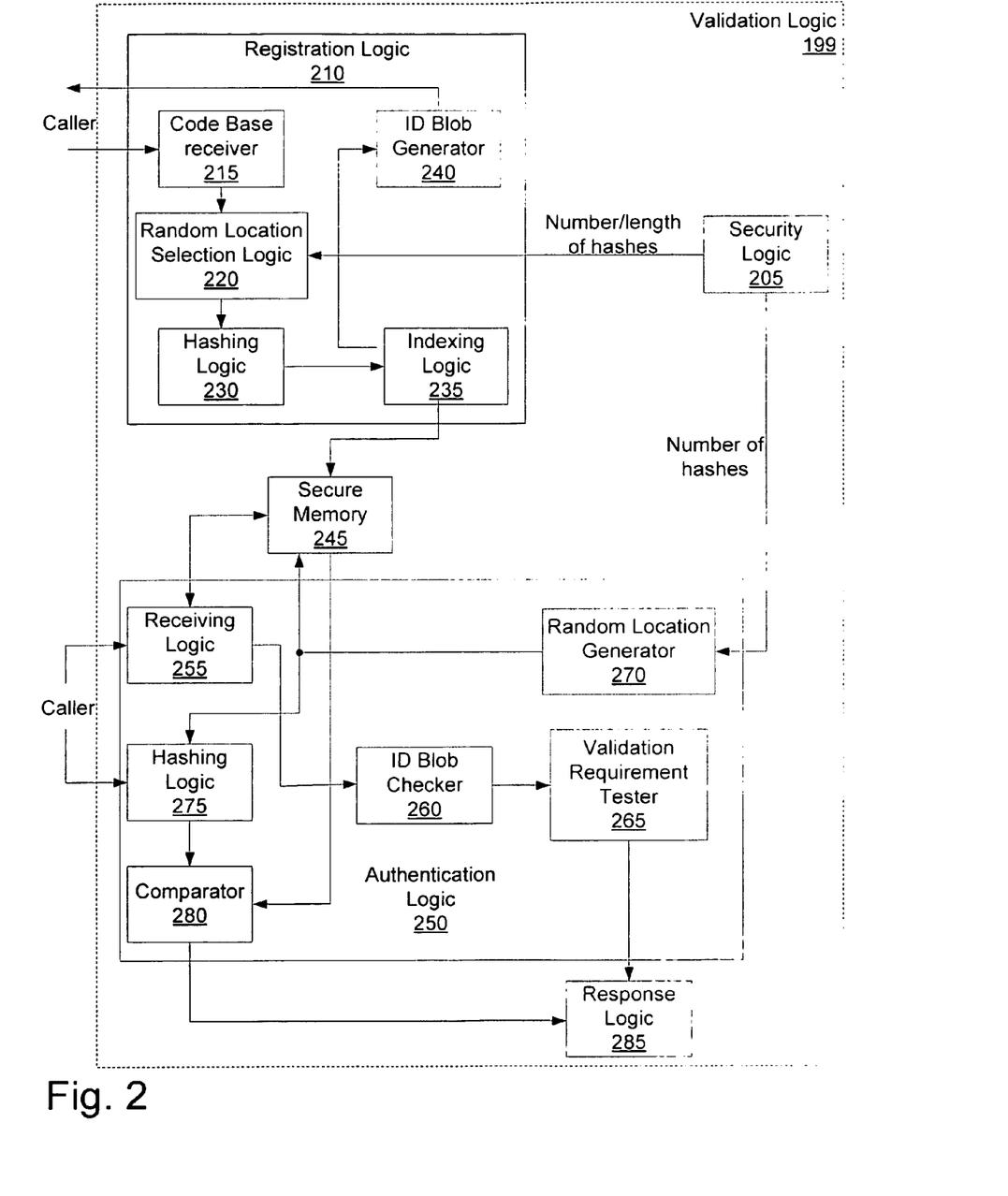
FIG. 2 is a block diagram of one embodiment of the validation logic.

FIG. 2 is a block diagram of one embodiment of the validation logic. The validation logic includes registration logic 210 and authentication logic 250. Registration logic 210 registers a caller, so that the caller can be authorized to make certain requests. Authentication logic 250 verifies, for at least some requests, that the caller who issued the request is authorized to make the request. For one embodiment, registration occurs when an application is initially installed on the computer system. Alternatively, registration may occur when a software application is booted on the machine. Alternatively, registration may initially occur when the computer is tested—e.g. at build time—and subsequently when new software is installed.

Registration logic 210 includes a code base receiver 215. The code base receiver 215 receives the caller's identity. For one embodiment, the caller's identity includes the identification of the caller's code base, and the requests, or types of requests, the caller will make. For one embodiment, the caller's code base is identified by starting location and total length.

The security logic 205, based on the identity of the caller and the types of requests it will make, determines the number of random hashes to make, and the length of the random hashes. For one embodiment, the length of the section of code base that is hashed may be set from as short as 8 bits to as long as the entire code base. The security logic 205 may create hashes based on code segments of variable lengths, or uniform length. The number of random hashes depends on the length, and the security level required for the particular caller. For example, for a caller that calls high security routines, the security logic 205 may hash all of the caller's code base, in large increments. Using larger code sections per hash increases the time to validate a request. For validation, a random selection of the hashes will be verified. For example, the security logic 205 may generate thirty hashes. For a particular request, the security logic may test 3 of those hashes. The number of hashes tested, and the length of each hash determines the time to validate a request. For one embodiment, the system administrator may set preferences in security logic 205, balancing length of time for validation against the level of security preferred.

The security logic 205 returns a number of hashes to generate and the length of each hash to the random location selection logic 220. The random location selection logic 220 selects random locations in the code base of the caller, for hashing. For one embodiment, the randomly selected code sections do not overlap. Alternatively, the code sections may overlap. The random location selection logic 220 may use the random number generator in the TPM, smart card, or host computer processor to generate starting points for the random code sections.

The code sections selected by the random location selection logic 220 are passed to hashing logic 230. Hashing logic 230 hashes the code section. Any type of hashing algorithm may be used. For one embodiment, the SHA-1 algorithm, built into the TPM is used.

The indexing logic 235 stores each of the hashes, and its corresponding location in the code base, in secure memory 245. The indexing logic 235, for one embodiment, creates an easy index into the hashed data, such that the hashes can be quickly found and compared.

ID blob generator 240 generates an ID blob for the caller. This ID blob is used by the caller to identify itself when it makes a request. The ID blob is used as an index into the secure memory, when a request is received from the caller. The ID blob generator 240 passes the ID blob of the registered caller back to the caller.

The authentication logic 250 includes receiving logic 255 to receive requests from a caller. The receiving logic 255 receives, for one embodiment, the ID blob of the caller (if it has one) and the actual request. The ID blob checker 260 determines the identity of the caller. If there is no ID blob, for one embodiment the request is automatically refused. For another embodiment, the request is directly passed to the validation requirement tester 265.

The validation requirement tester 265 determines whether for the particular request, and the particular caller if there was an ID blob, validation is required. If validation is not required, the request is passed directly to the response logic 285, which responds to the request. If validation is required, validation requirement tester 265 passes the data to random location generator 270.

Security logic 205 determines, based on the identity of the caller and the request how many hashes should be tested. In general, a subset of the hashes stored during registration are tested for verification. The security logic 205 determines how many hashes are tested.

The random location generator 270 generates the locations which will be tested. Note that these locations are a subset of the locations of the stored hashes. Thus, the random location generator 270 actually is selected randomly from the indexed hashes. The random location generator 270 may use the TPM's random number generator to select the hashes to verify.

The locations of the selected hashes, and their lengths are passed to the hashing logic 275. Hashing logic 275 receives the code base of the caller, and generates hashes of the selected sections. The newly generated hashes are then passed to comparator 280.

Comparator 280 retrieves the corresponding hashes from the secure memory 245, and compares each new hash to its corresponding registration hash. If the hashes match, then the caller is validated, and the request is passed on to the response logic 285. The response logic 285 responds to the request in the normal manner.

Note that for easy of understanding there are two hashing logics, and two random location selector/generators, and two receivers shown. One of skill in the art understands that these are "logical" blocks, and do not necessarily correspond to actual software. The separation is shown for simplicity, not to denote that separate implementations are required.

Figure 3:
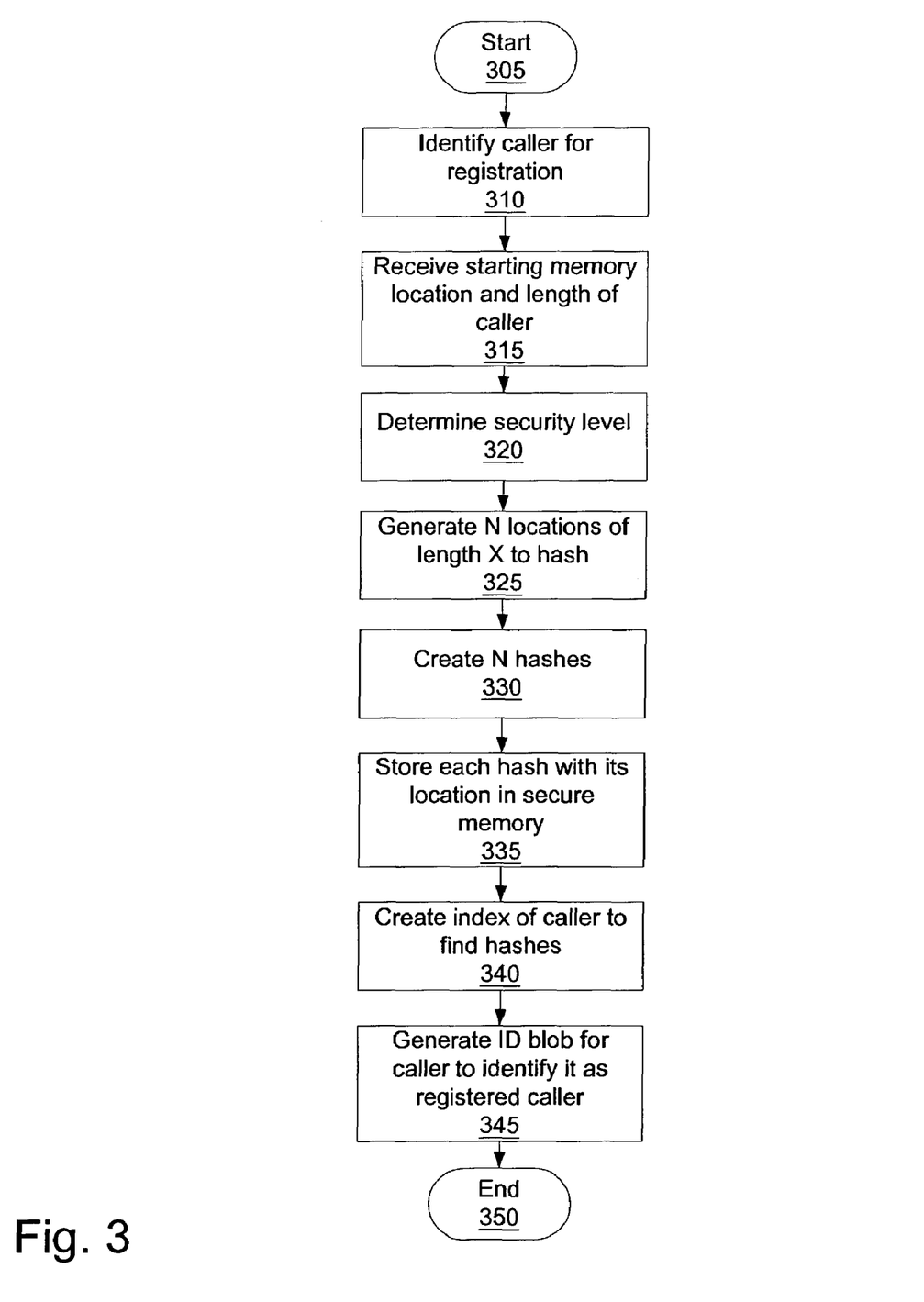
FIG. 3 is a flowchart of one embodiment of registering a caller for the validation mechanism.

FIG. 3 is a flowchart of one embodiment of registering a caller for the validation mechanism. As noted above, this process may take place when the software in which the caller is implemented is first uploaded to the computer system. Alternatively, the caller may be a remote system. In that case, the registration may occur every time the caller makes its first request. Alternatively, registration may occur when the computer system on which the callee resides is initially booted. The process starts at block 305, when a new caller initially starts the registration process.

At block 310, the caller is identified for registration. As noted, the caller is identified by the sets of requests the caller may make. These requests can range from low security requests, e.g. request for the time, to high security requests, e.g. requests for decryption of data or requests that change the security settings.

At block 315, the caller provides the starting memory location and length of its code base. Alternatively, the starting and ending memory locations may be provided. This data cannot change significantly, since it comprises the caller itself.

At block 320, the system determines the security level required for the caller. As noted above, some callers make higher security level requests. The process determines the security level of the requests expected from the caller. This security level is then used to determine how many hashes to create, and the length of each hash. The longer the hash, and the more of the code base is hashed, the more security is provided. However, the longer each hash the longer it takes to verify the caller. The process may permit a system administrator to set up the system to balance the speed and security factors, and select a hash length. Alternatively, the system administrator may set up the system to automatically select a particular hash length and number of hashes for each of a set of security levels.

At block 325, N locations of length X are selected to hash. The N locations are a large enough pool of location so that randomly selecting one or more of the N locations provides security. For one embodiment, the selected length of code do not overlap. Alternatively, the code segments may overlap, however, no two code segments may start at the same location.

At block 330, the process creates N hashes, one of each of the N code sections. For one embodiment, the SHA-1 algorithm, built into the TPM is used. Alternatively, any other hashing algorithm may be used.

At block 335, each hash is stored, with its location in secure memory, and at block 340, an index of the hashes is created. The index permits a fast lookup of the hash results of any of the locations. For one embodiment, each registered caller is indexed, such that a single lookup can access all of the locations.

At block 345, an ID blob is created for the caller, to identify it as a registered caller. For one embodiment, the ID blob is the index into the secure memory where the caller's hashes are stored. Alternatively, the ID blob may be any type of identification used by the caller, and known to the callee. For one embodiment, the ID blob may be an overall of the caller hash plus the collection of the random hashes with their locations, encrypted by the private key of the TPM, bundled together. The process then ends at block 350.

Figure 4A:
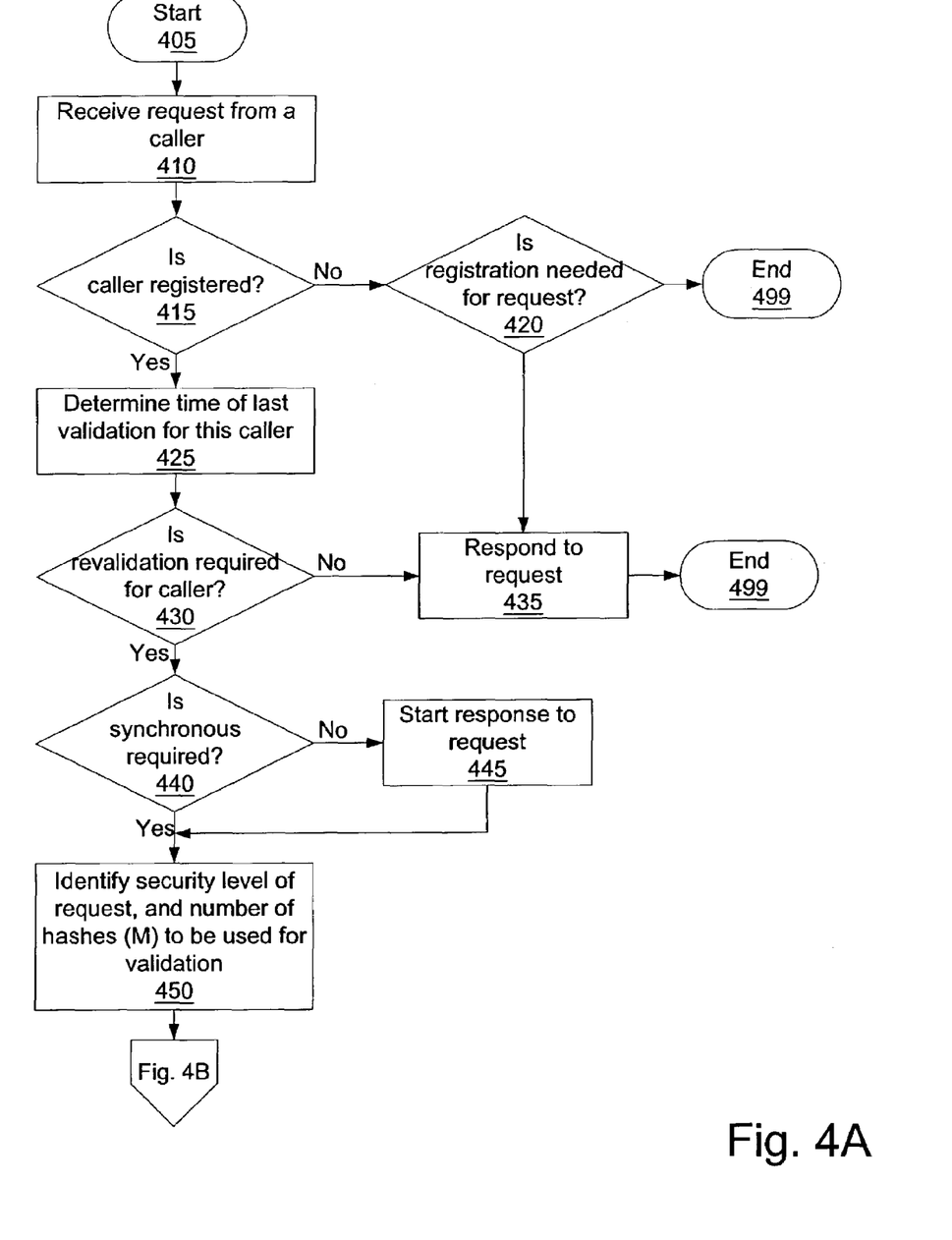
FIGS. 4A and 4B are a flowchart of one embodiment of a caller using the validation mechanism.
Figure 4B:
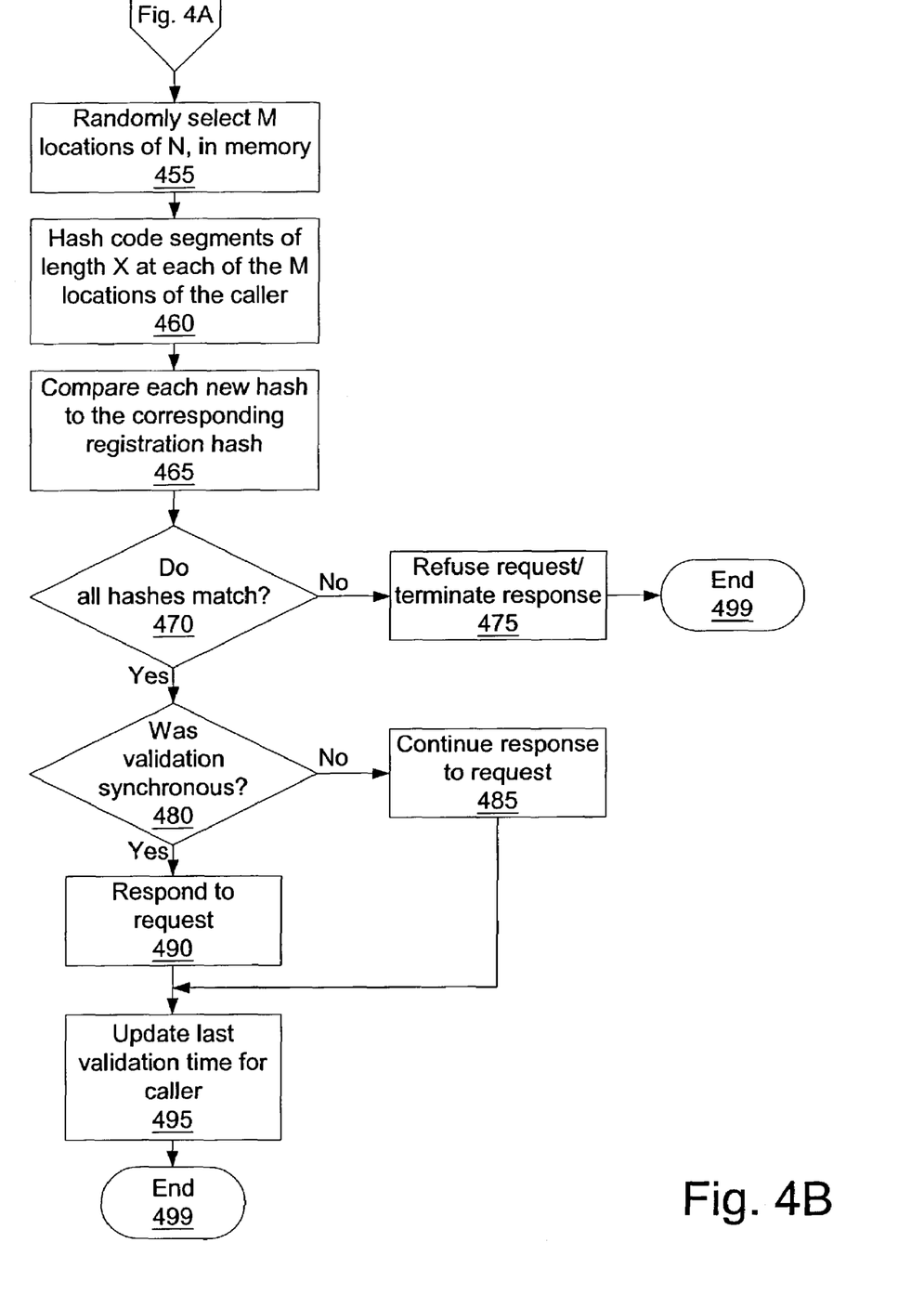

FIGS. 4A and 4B are a flowchart of one embodiment of a caller using the validation mechanism. The process starts at block 405. At block 410, a request is received from a caller. The caller may be any application, such as a device driver, DLL, application, network device, etc. Any application that can make a request can be considered a caller.

At block 415, the process determines whether the caller is registered. As described above with respect to FIG. 3, each caller that wishes to make secure requests is registered. If the caller is not registered, the process continues to block 420. At block 420, the process determines whether registration is needed for the request received from the caller. For one embodiment, certain low-security requests-may not require a registered caller. If no registration is required for the present request, the process continues to block 435, and responds to the request. Otherwise, the process terminates at block 499. For another embodiment, all requests may require a registered caller. In that instance, the above step may be skipped.

If the caller is registered, at block 415, the process continues to block 425. At block 425, the process determines the last time the caller was validated. For one embodiment, callers only are validated periodically. These periods may range from a few micro-seconds to hours. Alternatively, callers may be validated only if a specific period of time has elapsed since a request has been received from the particular caller. Alternatively, callers may be validated for every Y-th call.

At block 430, the process determines whether revalidation is required. If the last validation of the caller is still acceptable, the process continues to block 435, and the request is responded to. The process then ends at block 499.

If revalidation is required, the process continues to block 440.

At block 440, the process determines whether synchronous validation is required. Asynchronous validation initiates the response, prior to completing the validation. This can be used for time-critical responses, in which the time dependence is considered more important than absolute security. For example, for streaming video/data, asynchronous validation may be preferred. In general, the incomplete data set is not considered a security risk. If synchronous validation is not required, the process starts the response at block 445, and continues to block 450. If synchronous validation is required, the process continues directly to block 450.

At block 450, the security level of the request is identified, and thus the number of hashes M to be used for validation is identified. As noted above, the security logic determines how secure the request is, and selects a subset of the N hashes stored for the caller, for validation.

At block 455, the process randomly selects M locations, of the N locations in memory. For one embodiment, the random number generator of the TPM is used to generate the locations.

At block 460, a code section of length X (the registration length for the caller) is hashed for each of the M locations. The same hashing algorithm as was used for registration is used.

At block 465, each of the newly generated hashes is compared with its corresponding registration hash. For one embodiment, when the M locations are generated, the system retrieves the corresponding registration hashes, for the comparator. The comparator then performs the comparison.

At block 470, the process determines whether all of the hashes match. If they do not, the request is refused. If the validation was asynchronous, e.g. the response was started prior to the completion of verification, the response is terminated immediately. The process then ends, at block 499.

If the hashes match, the process at block 480 determines whether the validation was synchronous. If not, the response was started earlier, and at block 485, the response is continued. If the validation was synchronous, i.e. the response was not yet started, at block 490, the response is sent to the request.

At block 495, the validation time is updated for the caller. The process then terminates at block 499. Note that although the above process is described as a flowchart, the various steps may be performed in other, logical orders. For one embodiment, the process shown in FIGS. 4A-B is a thread spawned by a callee every time a new request is received from a caller. For one embodiment, if a validation is in process for a particular caller, and a new request is received for the same caller, the present process is not executed twice. Rather, a single validation is considered sufficient for all requests received during the first validation cycle. Similar alterations and optimizations may be implemented, as would be obvious to one of skill in the art. This validation mechanism represented in FIGS. 4A-B may be implemented in software running on the host computer processor, or it may be performed in hardware or firmware of a separate device. The calling software provides the caller ID to be validated and the security device performs the validation operation by generating and comparing the hash values of random locations.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus comprising a computer system including a processor and a chipset, said computer system including:
   an authentication logic to authenticate a registered caller, the authentication logic to use hashes of one or more random locations within the caller's code base, the one or more random locations comprising a portion of the code base less than the complete code base, to validate that the caller is registered.

2. The apparatus of claim 1, wherein the authentication logic comprises:
   a receiving logic to receive a request from a caller;
   a random location generator to generate a plurality of locations in the caller's code base;
   a hashing logic to hash a preset code length at each of the plurality of locations; and
   a comparator to compare the new hashes generated by the hashing logic to corresponding registration hashes for the caller.

3. The apparatus of claim 2, further comprising:
   an ID blob checker to receive an ID blob from the caller, and to determine whether the caller is a registered caller.

4. The apparatus of claim 2, further comprising:
   a validation requirement tester to determine whether the request from the caller requires validation, and if the request from the caller does not require validation, the validation requirement tester to pass the request to response logic to respond to the request.

5. The apparatus of claim 4, further comprising:
   the validation requirement tester to pass the caller's information to the random location generator, if the request from the caller requires validation.

6. The apparatus of claim 2, further comprising:
   a security logic to determine a level of validation required for the request.

7. The apparatus of claim 6, wherein the level of validation determines a number of random locations that are validated.

8. The apparatus of claim 6, wherein the level of validation determines whether validation is synchronous or asynchronous, the apparatus further comprising:
   a response logic to start a response to the request, if the validation is asynchronous, the validation occurring during the response; and
   the response logic terminating the response if the validation fails.

9. The apparatus of claim 2, further comprising:
   a response logic to respond to the request if the new hashes match the corresponding registration hashes.

10. The apparatus of claim 1, further comprising a registration logic to register the caller, the registration logic comprising:
    a selection logic to use an entire code base of the caller and select a plurality of locations to hash;
    a hashing logic to hash a set length of code at each of the plurality of locations;
    a secure memory to store the plurality of hashes; and
    an indexing logic to attach an index number to the caller and to each of the hashes.

11. The apparatus of claim 10, further comprising:
    a security logic to set the length of code for hashing.

12. The apparatus of claim 11, wherein the length of code is between 32 and 256 bits.

13. The apparatus of claim 11, wherein the length of code hashed is variable, such that a set of hashes represents code segments of various lengths.

14. The apparatus of claim 11, further comprising:
    the security logic to identify security levels for the caller, the security levels determining a number of hashes to check for validation.

15. The apparatus of claim 14, wherein the number of hashes to check depends on the request being received.

16. A method to validate a registered caller comprising:
    receiving a request from the registered caller;
    selecting a subset of locations to validate the registered caller;
    creating hashes of the subset of locations and comparing the hashes to registration hashes for the registered caller; and
    if the hashes match the registration hashes, marking the registered caller as validated.

17. The method of claim 16, further comprising:
    after receiving a request, determining whether the registered caller requires validation for the request; and
    if the registered caller does not require validation for the request, performing the request without validation.

18. The method of claim 17, wherein the registered caller requires validation for high security level requests.

19. The method of claim 17, wherein the registered caller requires validation for every N-th request.

20. The method of claim 17, wherein the requirement for validation is random.

21. The method of claim 16, wherein the subset of locations to be hashed are randomly selected.

22. The method of claim 16, wherein a number of locations to be hashed are based on a security level of the request.

23. The method of claim 22, wherein the number of locations to be hashed is a subset of a number of locations hashed during registration.

24. A computer system comprising:
- a processor;
- a trusted platform module (TPM) to perform validation, the TPM including a validation logic, the validation logic comprising:
  - a registration logic to register authorized callers; and
  - an authentication logic to authenticate the registered callers, the authentication logic to use hashes of one or more random locations within the caller's code base to validate that the caller is registered, the one or more random locations comprising a portion of the code base less than the complete code base.

25. The system of claim 24, wherein the registration logic comprises:
- a selection logic to select a plurality of locations in the caller's code base to hash;
- a hashing logic to hash a set length of code at each of the plurality of locations;
- a secure memory to store the plurality of hashes; and
- an indexing logic to attach an index number to the caller and to each of the hashes.

26. The system of claim 25, further comprising a security logic to determine a number of locations to hash and to determine the set length of code to hash.

27. The system of claim 24, wherein the authentication logic comprises:
- a receiving logic to receive a request from a caller;
- a random location generator to generate a plurality of locations in the caller's code base;
- a hashing logic to hash a preset code length at each of the plurality of locations; and
- a comparator to compare the new hashes generated by the hashing logic to corresponding registration hashes for the caller.

28. The system of claim 27, wherein only some requests are authenticated.

29. The system of claim 28, wherein the authenticated requests are API/IOCTL requests.

30. A machine readable storage medium having stored thereon data representing sequences of instructions, which when executed by a computer system, cause said computer system to perform the steps of:
- receiving a request from a caller;
- selecting a subset of locations in the caller's code base to validate the registered caller;
- creating hashes of a selected code length at each of the subset of locations;
- comparing the hashes to registration hashes for the registered caller; and
- validating the caller if the hashes match the registration hashes.

31. The machine readable storage medium of claim 30, further comprising:
- registering a caller to enable the caller to make requests comprising:
  - selecting an assortment of locations in the caller's code base;
  - selecting a code segment length for hashing;
  - hashing the code segment of the selected length at each of the assortment of random locations; and
  - storing the hashes as the registration hashes for the caller;
- the subset of locations used for validation being a subset of the assortment of locations stored as the registration hashes.

* * * * *